United States Patent [19]

Lang et al.

[11] 4,402,428

[45] Sep. 6, 1983

[54] DOSING APPARATUS FOR VISCOUS MATERIALS

[75] Inventors: Hans-Jörg Lang, Biberbach; Ernst Schwerdtel, Munich, both of Fed. Rep. of Germany

[73] Assignee: Ludwig Schwerdtel GmbH, Karlsfeld, Fed. Rep. of Germany

[21] Appl. No.: 244,822

[22] Filed: Mar. 17, 1981

[30] Foreign Application Priority Data

Jun. 20, 1980 [DE] Fed. Rep. of Germany ....... 3023003

[51] Int. Cl.$^3$ ............................................. G01G 11/14
[52] U.S. Cl. ........................................ 222/58; 222/334
[58] Field of Search ....................... 222/52, 56, 58, 64, 222/71, 77, 334; 177/46, 117

[56] References Cited

U.S. PATENT DOCUMENTS 3,306,495 2/1967 Wabers .................................. 222/77
4,170,253 10/1979 McArthur ........................ 222/334 X
4,228,924 10/1980 Gilbert ............................ 222/334 X Primary Examiner—Joseph J. Rolla
Assistant Examiner—Michael S. Huppert
Attorney, Agent, or Firm—Browdy & Neimark

[57] ABSTRACT

A dosing device for viscous materials, especially for paints, has a dosing cylinder, in which is disposed a dosing piston coupled with a hydraulically chargeable piston cylinder drive. A multi-way valve is placed ahead of the dosing cylinder to which is connected, on the one hand, a line for the supply of the material and, on the other hand, a pressure line for extrusion of the metered material by a drive, via a dispensing valve. The lines can be connected to the dosing cylinder selectively. The apparatus is embodied as a mobile unit. An open storage container is provided, from which originates the line for the supply of the material to the dosing cylinder which is embodied as a suction line. The drive is operatively arranged to effect the suction operation of the dosing piston.

8 Claims, 6 Drawing Figures

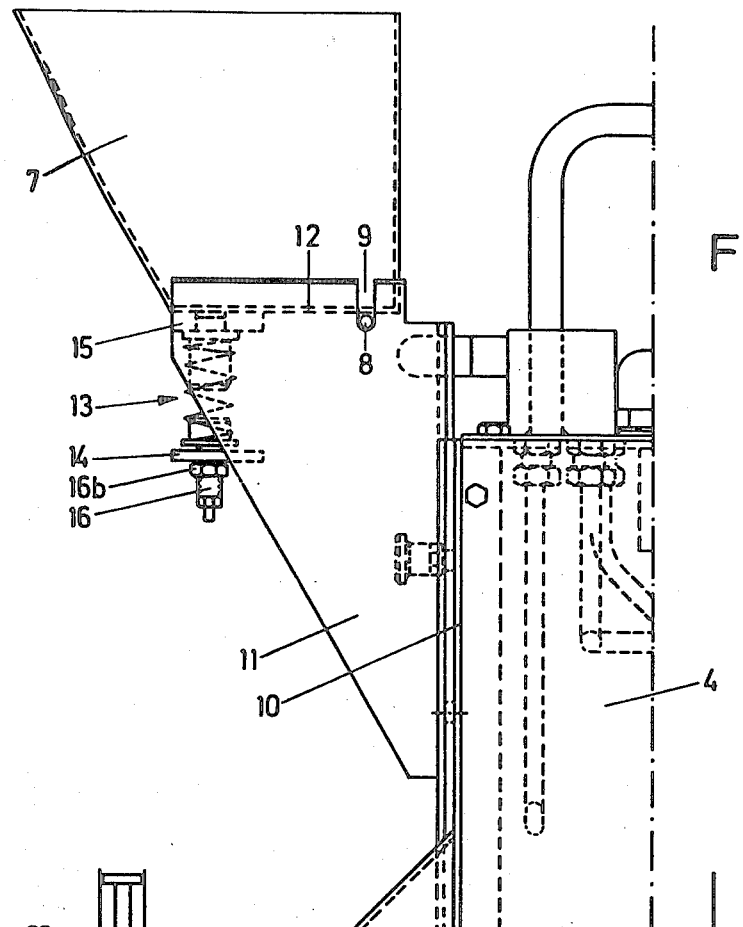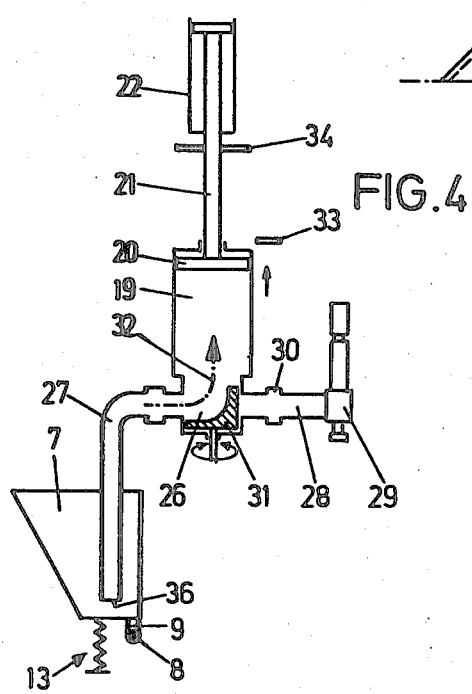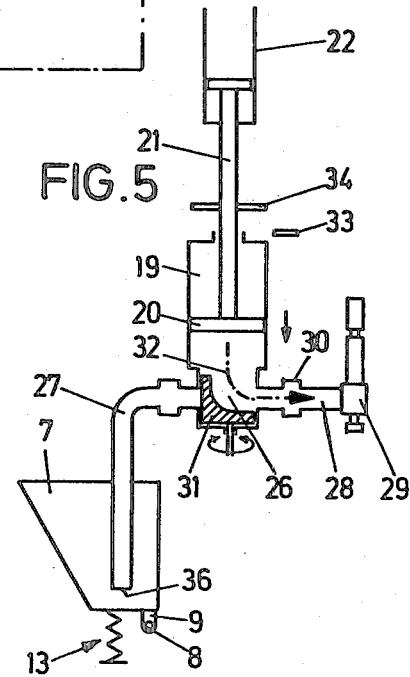

DOSING APPARATUS FOR VISCOUS MATERIALS

FIELD OF THE INVENTION

The invention concerns a dosing device for viscous materials, especially for paints of the type provided with a dosing cylinder, in which is disposed a dosing piston coupled with a hydraulically chargeable piston cylinder drive. More particularly, the invention relates to such a device which includes a multi-way valve placed ahead of the dosing cylinder to which is connected, on the one hand, a line for the supply of the material and, on the other hand, a pressure line for the extrusion of the metered material by means of the drive via a dispensing valve. The lines can be selectively connected to the dosing cylinder.

BACKGROUND OF THE INVENTION

In the paint and lacquer industry, where viscous materials such as pigments, for instance, are worked in comparatively small amounts on so-called roller frames, these materials are taken from the roller frame and are fed to a conveying device, for example a press or a pump. This conveying device feeds these materials under pressure to the dosing cylinder of a dosing apparatus, the dosing piston of which is lifted under the pressure of the material until a predetermined charge of the dosing cylinder has been effected. Subsequently the valve associated with the dosing cylinder is closed and the material is fed under a suitable pressure from the piston cylinder drive via a pressure line to a dispensing valve, from which it is dispensed into a can or similar container. Dosing apparatus of this kind with an associated conveying device have shown good results in the field; however, they have the basic disadvantage that every roller frame requires its own conveying device and its own dosing apparatus. Dosing apparatus of this kind with an associated conveying device, consequently can only be employed in those instances where the same material, for instance the same paint, is produced over very long periods of time and in such amounts so as to make such a dosing apparatus sufficiently efficient. In firms where materials are often changed or a great number of small roller frames are employed, however, such devices cannot be employed at all or at least not efficiently.

SUMMARY OF THE INVENTION

The principal object of the present invention is to produce a dosing apparatus by which material can be taken from a number of roller frames, or the like, and can be measured out without necessitating an intermediate conveying.

The foregoing object, as well as others which are to become apparent below is achieved in a dosing apparatus for viscous materials, especially for paints, of the type provided with a dosing cylinder, in which is disposed a dosing piston coupled with a hydraulically chargeable piston cylinder drive. More particularly, the invention relates to such a device which includes a multi-way valve placed ahead of the dosing cylinder to which is connected, on the one hand, a line for the supply of the material and, on the other hand, a pressure line for the extrusion of the metered material by means of the drive via a dispensing valve. The lines can be selectively connected to the dosing cylinder. The salient features of the invention are that the apparatus is embodied as a mobile unit, an open storage container is provided, from which originates the line for supplying material to the dosing cylinder, which is embodied as a suction line, and the drive for the suction operation of the dosing piston is drivable.

The essence of the invention is the fact that the dosing apparatus has been made completely independent, i.e. because of the departure from the pressure feed principle, by employing a separate conveyor device based on the suction feed principle with using a dosing piston, the use of a separate feed becoming entirely superfluous. Because the unit is independent and mobile it can be used in any place at any time. Finally it has its own storage container into which the material can run freely from the roller frame or the like and from which it is suctioned into the dosing cylinder in turn.

In a preferred embodiment a feed gage monitor is associated with the storage container.

The feed gage monitor has advantageously a pre-stressable compression spring and an associated limit switch for the monitoring of a minimal amount of fill.

The feed gage monitor further may advantageously have an additional adjustable spring with an associated additional limiting switch for the monitoring of the maximal amount of fill.

The storage container, the suction line and the dosing cylinder are individually freely, respectively interchangeable with other like members.

Because of the monitoring device and the compression spring, a suction stroke of the dosing piston and thereby a dosing sequence is only initiated when sufficient material is contained in the storage container.

Because of the interchangeability of elements, it becomes possible to change quickly to other materials.

BRIEF DESCRIPTION OF THE DRAWINGS

Other advantages and characteristics of the invention can be seen from the description of an exemplary embodiment, reference being made to the drawings, in which:

FIG. 3 shows a partial section from FIG. 1, concerning the storage container, in an enlarged scale;

FIG. 4 shows the dosing apparatus during the suction stroke in a somewhat schematic representation;

FIG. 5 shows the dosing apparatus extruding the measured-out materials in a somewhat schematic representation.

DETAILED DESCRIPTION OF THE PREFERRED EMBODIMENT

Figure 1:
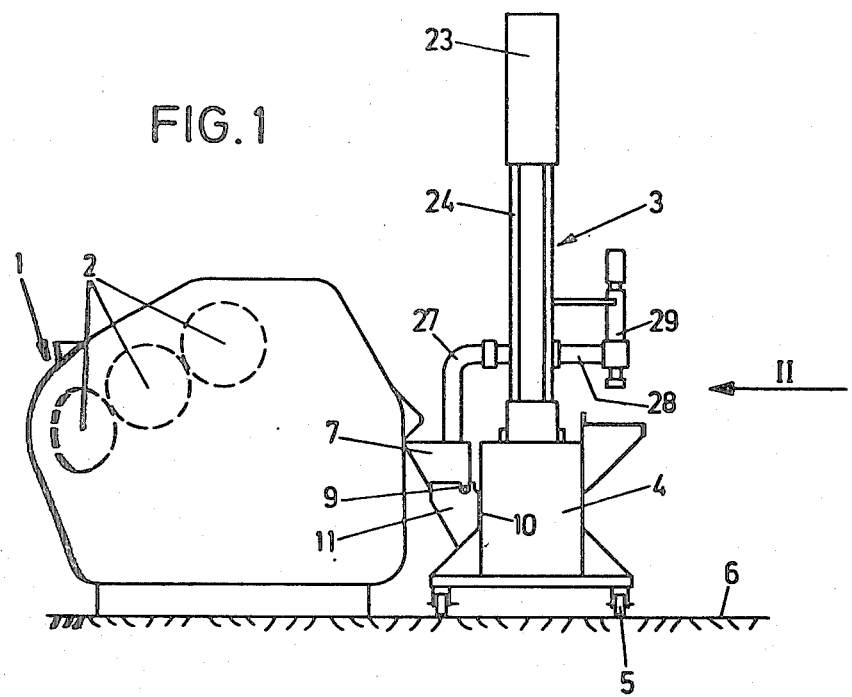
FIG. 1 shows a side view of the dosing apparatus as used in front of a roller frame in view in accordance with the arrowheaded line I in FIG. 2.
Figure 2:
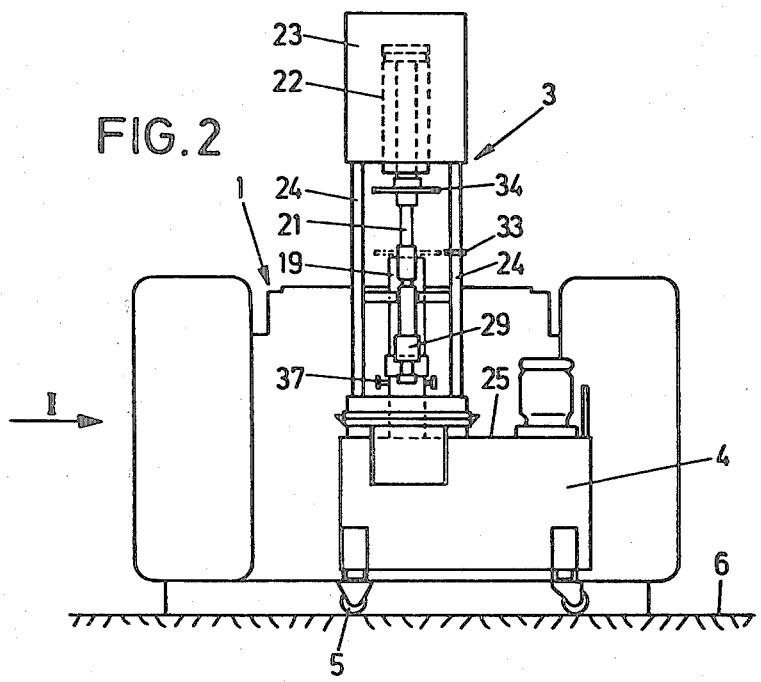
FIG. 2 shows the dosing apparatus and the roller frame in a front view in accordance with the arrowheaded line II in FIG. 1.

A mobile dosing apparatus 3 is associated with a roller frame 1, the rollers 2 of which are only suggested by broken lines in the drawing. Such roller frames 1, especially the three-roller frame shown in the drawings, are generally known and have been used for years, especially in the paint industry, for the fine grinding of pigments. The paints or other materials leave the roller frame in a viscous state. These viscous (but still able to flow) materials are routed to the dosing device 3 for measuring-out and the following dispensing of exactly measured amounts into containers.

The dosing apparatus 3 has a box-shaped undercarriage 4 supported against the floor 6 by casters 5 and is freely movable. The apparatus necessary for the operation of the dosing device, such as a hydraulic-pump, control machinery, etc., are contained in the undercarriage 4, so that the apparatus can be used anywhere, provided electric current is available.

A generally funnel-shaped storage container 7 is disposed at the back of the undercarriage, which is supported by holding pins 8 in slits 9 (open towards the top) of a base support 11 disposed on the back wall 10 of the undercarriage. The holding pins 8 and the corresponding slits 9 are disposed near the back wall 10, the bottom 12 of the storage container 7 is further supported by a feed gage monitor 13 which forms the third support point of the storage container 7. The device 13 has a lower support 14 and an upper support 15, both fastened to the base support 11.

A tightening screw 16 is disposed on the lower support, which is longitudinally adjustable by its thread 16a and against which a helical compression spring 17 is supported, which can be pre-stressed. This helical compression spring 17 is supported at its upper end against a support pin 18, which penetrates through a bore 18a in the upper support 15 and is itself supported with its stop collar 18b against the upper support 15. The storage container 7 rests with its bottom 12 on the upper surface of the support pin 18. The pre-stressing of the compression spring is accomplished by moving the tighting screw 16 by turning it and adjusting its height relative to the lower support 14, by which the annular collar 18c on tightening screw 16, against which the compression spring 17 rests, is also height-adjusted. Since the upper position of the support pin 18 is fixed against the lower surface of the upper support 15 by the stop of the stop collar 18b, exact pre-stressing can be accomplished. The tightening screw 16 is secured relative to the lower support 14 by means of a counter-nut 16b screwed on the thread 16a.

A contact-free functioning initiator, i.e. limit switch 18d, is associated with the feed gage monitor 13, which penetrates via a bore 18e through the upper support 15. Once the weight of the storage container 7, i.e. the weight of the materials contained therein, exceeds a value preset by the pre-stressing of the compression spring 17, the storage container 7 lightly pushes down the support pin 18 against the tension of the compression spring 17, while rotating around the holding pin 8, thus causing the limit switch 18d to send a signal, which is utilized in a way to be explained further below.

Figure 6:
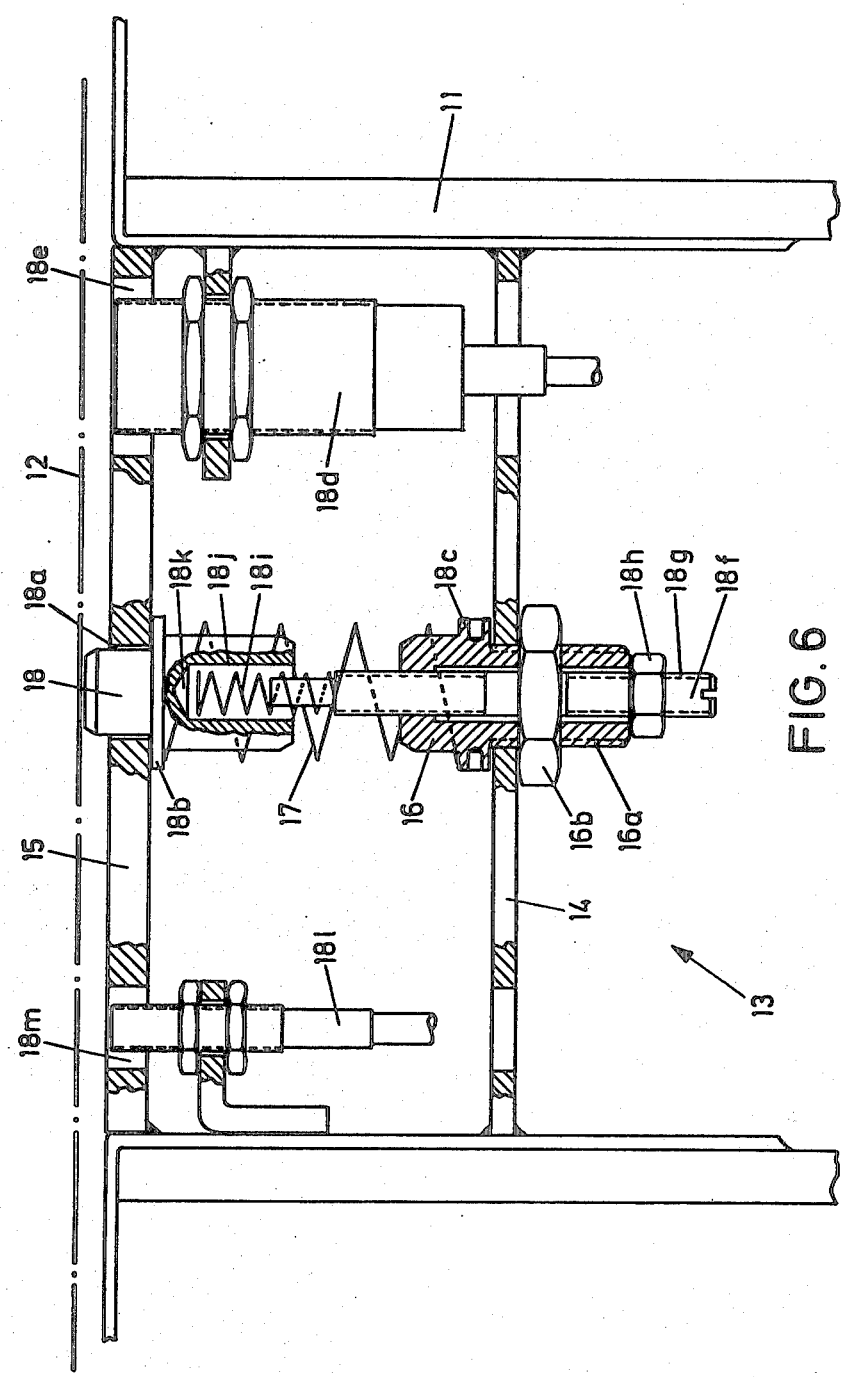
FIG. 6 shows details of a feed gage monitor

An adjusting screw 18f is disposed lengthwise adjustably by means of a thread 18g within the hollow, tightening screw 16. The former can be secured by a securing nut 18h screwed onto the thread 18g in its position relative to the tightening screw 16. A second comparatively stiff, but not pre-stressed helical spring 18i is disposed on the adjusting screw 18f, which is contained in a blind-bore aperture 18j in the underside of the support pin 18. Its upper end is free of the bottom 18k of the aperture 18j while in the rest position illustrated in FIG. 6. The distance of the associated end of the helical spring 18i from the bottom 18k of the aperture 18j is adjustable by means of the adjusting screw 18f. Associated with this is a second initiator, also height-adjustable, i.e. a second contact-free functioning limit switch 18l, which also penetrates via a bore 18m through the support 15. Once the weight of the material in storage container 7 substantially exceeds the minimum weight explained above, the support pin is pushed down far enough that the second helical spring 18, too, engaged which causes the totality of the spring system, consisting of the compression spring 17 and the helical spring 18i, to become much stiffer. With a further deflection of the storage container 7 the limit switch 18l then emits a signal which is utilized in a way to be explained further below.

The dosing device itself is fastened to the undercarriage 4. It has a vertically disposed dosing cylinder 19, in which is disposed a dosing piston 20, fastened in turn to the free end of an adjustable-in-length piston rod 21 of a hydraulically operable piston cylinder drive 22. This drive 22 is generally contained in a housing 23 supported by four supports 24 on the undercarriage 4, while the dosing cylinder 19 is supported on the upper surface 25 of the undercarriage 4 between the supports 24.

The dosing cylinder 19 has in its lower part a three-way valve 26 connected on the one hand via a suction line 27 with the storage container 7 and on the other via a pressure line 28 with a dispensing valve 29. The third opening of the valve 26 leads to the dosing cylinder 19. The suction line 27 and the pressure line 28 with dispensing valve 19 are respectively connected by means of quick-disconnect couplings 30 to the corresponding connections of the valve 26. The valve 26 can selectively be set for suction or extrusion. To suction the material from the storage container 7 via the suction line 27, a so-called rotatable deflector 31 is turned to the position shown in FIG. 4, in which the pressure line 28 is closed, while the suction line 27 is connected with the dosing cylinder 19. By charging the piston cylinder drive 22 with pressure fluid the piston rod 21 and with it the dosing piston 20 are moved upwards and suction a corresponding amount of viscous material into the dosing cylinder in the direction of the directional arrowheaded line 32. The length of the stroke by which the piston rod 21 and with it the dosing piston 20 is displaced is preset by the corresponding length adjustment of the piston rod 21. This means, in other words, that the initial position of the dosing piston 20 is determined by the corresponding adjustment in length. The suction stroke is limited by an internal stop inside the hydraulic cylinder 22.

In order to extrude the material contained in the dosing cylinder 19, i.e. to activate the dosing stroke, the rotatable deflector 31 is turned to the position illustrated in FIG. 5, in which it closes the suction line 27, but opens the pressure line 28. The drive 22 is charged with hydraulic fluid acting in a downward direction either by a manual trigger or by a signal indicating that a container to be filled is positioned beneath the dispensing valve 29, so that the material contained in the dosing cylinder 19 is extruded by the dosing piston 20 via the pressure line 28 and the dispensing valve 29.

A contact-free operating limit switch 33 is disposed on one of the supports 24 and is height-adjustable, with which a contactor 34, disposed on the piston rod 21, is associated. As soon as the contactor 34 contacts the limit switch 33, the dispensing valve 29 is closed and the dosing stroke ended.

The feed gage monitor 13 is adjusted in such a manner that the limit switch 18d emits a signal at the time when the amount of dispensed material able to be suctioned via the suction line 27 is at least as great as a predetermine filling amount for the dosing cylinder 19. Of course only that amount of material can be taken into consideration which is located above the suction orifice 36 of the suction line 27. Only at the time that the signal indicating that the corresponding amount is present in the storage container 7 arrives from this limit switch is the circuit controlling the filling stroke of the dosing cylinder 19 released.

On the other hand, if a signal arrives from the limiting switch 18l, it indicates that the storage container has been overfilled, i.e. threatens to overflow. In this case an alarm is activated and/or the roller frame 1 is turned off.

The dosing cylinder 19 is fastened by set screws 37, which are easily loosened, so that it can be exchanged quickly for another dosing cylinder.

It will be obvious to those skilled in the art that various changes may be made without departing from the scope of the invention and the invention is not considered limited to what is shown in the drawings and described in the specification.

What is claimed is:

1. In a dosing device for viscous materials, especially for paints, including a dosing cylinder in which is disposed a dosing piston coupled with a hydraulically chargeable piston cylinder drive, a multi-way valve disposed downstream of the dosing cylinder and connected on one side to a line for supply of the materials and on another side to a pressure line for the extrusion of metered material by means of the drive via a dispensing valve, each of said lines being selectively connected to the dosing cylinder, the improvement comprising:
   an open storage container,
   said dosing cylinder defining suction-producing means, said line for the supply of the material to the dosing cylinder interconnecting said storage container with said suction apparatus,
   a feed station monitoring device associated with said storage container having a pre-stressable compression spring coupled to first switching means for monitoring the minimal amount of fill in said container as well as an adjustable spring coupled to a second switching means for monitoring the maximal amount of fill in said container.

2. An improved dosing apparatus according to claim 1, wherein said storage container is freely interchangeable.

3. An improved dosing apparatus according to claim 2, wherein said suction line is freely interchangeable.

4. An improved dosing apparatus according to claim 3, wherein said dosing cylinder is freely interchangeable.

5. An improved apparatus according to claim 2, wherein said dosing cylinder is freely interchangeable.

6. An improved apparatus according to claim 1, wherein said suction line is freely interchangeable.

7. An improved dosing apparatus according to claim 1, wherein said dosing cylinder is freely interchangeable.

8. An improved dosing apparatus according to claim 7, wherein said storage container is freely interchangeable.

* * * * *